(12) United States Patent
Sethna (10) Patent No.: US 8,308,329 B1
(45) Date of Patent: Nov. 13, 2012

(54) DIRECTIONALIZING FIBER OPTIC PLATE

(75) Inventor: Vijay M. Sethna, Fremont, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 516 days.

(21) Appl. No.: 12/641,420

(22) Filed: Dec. 18, 2009

(51) Int. Cl.
*F21V 7/04* (2006.01)
(52) U.S. Cl. ........ 362/554; 362/551; 362/555; 362/600; 385/147
(58) Field of Classification Search ................... 362/551, 362/554, 555, 600; 385/147
See application file for complete search history.

(56) References Cited

U.S. PATENT DOCUMENTS

| | | | | |
|---|---|---|---|---|
| 5,009,475 A * | 4/1991 | Knudson | | 385/116 |
| 5,301,090 A * | 4/1994 | Hed | | 362/558 |
| 6,195,016 B1 * | 2/2001 | Shankle et al. | | 340/815.42 |
| 7,352,951 B2 * | 4/2008 | Gotfried | | 385/147 |
| 7,703,941 B2 * | 4/2010 | Lee | | 362/219 |
| 7,892,381 B2 * | 2/2011 | Kerr et al. | | 156/227 |
| 2002/0097978 A1 * | 7/2002 | Lowry et al. | | 385/147 |
| 2008/0069505 A1 * | 3/2008 | Reichel et al. | | 385/120 |

FOREIGN PATENT DOCUMENTS

JP 2008281605 * 11/2008

* cited by examiner

*Primary Examiner* — Ali Alavi
(74) *Attorney, Agent, or Firm* — Donna P. Suchy; Daniel M. Barbieri

(57) ABSTRACT

An image display device may include a fiber optic plate. The fiber optic plate may comprise a plurality of parallel optical fibers, the terminal ends of the optical fibers combining to define a light input surface and an at least partially concave light output surface.

An apparatus may include: a fiber optic plate; and a mechanism for affixing the fiber optic plate to a display device.

A method for manufacturing a fiber optic plate may include: computing one or more viewing angles between one or more elements of an image display and a focal point; and shaping a fiber optic plate output surface according to the one or more viewing angles.

15 Claims, 10 Drawing Sheets

DIRECTIONALIZING FIBER OPTIC PLATE

BACKGROUND

Many modern displays seek to maximize the field of view available to users. However, certain situations may require the limiting the field of view of light emitted by such displays. For example, it may be desirable to limit the field of view for privacy reasons or in order to minimize extraneous reflection of the emitted light by a surrounding environment.

Particularly, reflections due to avionics displays may be a major hindrance to pilots operating aircraft equipped with wraparound canopies. Various solutions have been proposed to reduce such reflections. Such solutions may include privacy films and optical wedges. However, privacy films may reduce the transmittance of the associated display. Optical wedges may only control reflections in one direction and also reduce the transmittance of the associated display.

As such, it may be desirable to provide an apparatus for limiting the field of view of a display while retaining the transmittance of the displayed images.

SUMMARY

An image display device may include a fiber optic plate. The fiber optic plate may comprise a plurality of parallel optical fibers, the terminal ends of the optical fibers combining to define a light input surface and an at least partially concave light output surface.

An apparatus may include: a fiber optic plate; and a mechanism for affixing the fiber optic plate to a display device.

A method for manufacturing a fiber optic plate may include: computing one or more viewing angles between one or more elements of an image display and a focal point; and shaping a fiber optic plate output surface according to the one or more viewing angles.

BRIEF DESCRIPTION OF THE DRAWINGS

The disclosure will become more fully understood from the following detailed description, taken in conjunction with the accompanying drawings, wherein like reference numerals refer to like elements, in which Figure Reference No.

DETAILED DESCRIPTION

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may be not limited to the particular embodiments depicted in the exemplary diagrams, but should be construed in accordance with the language in the claims.

Figure 1:
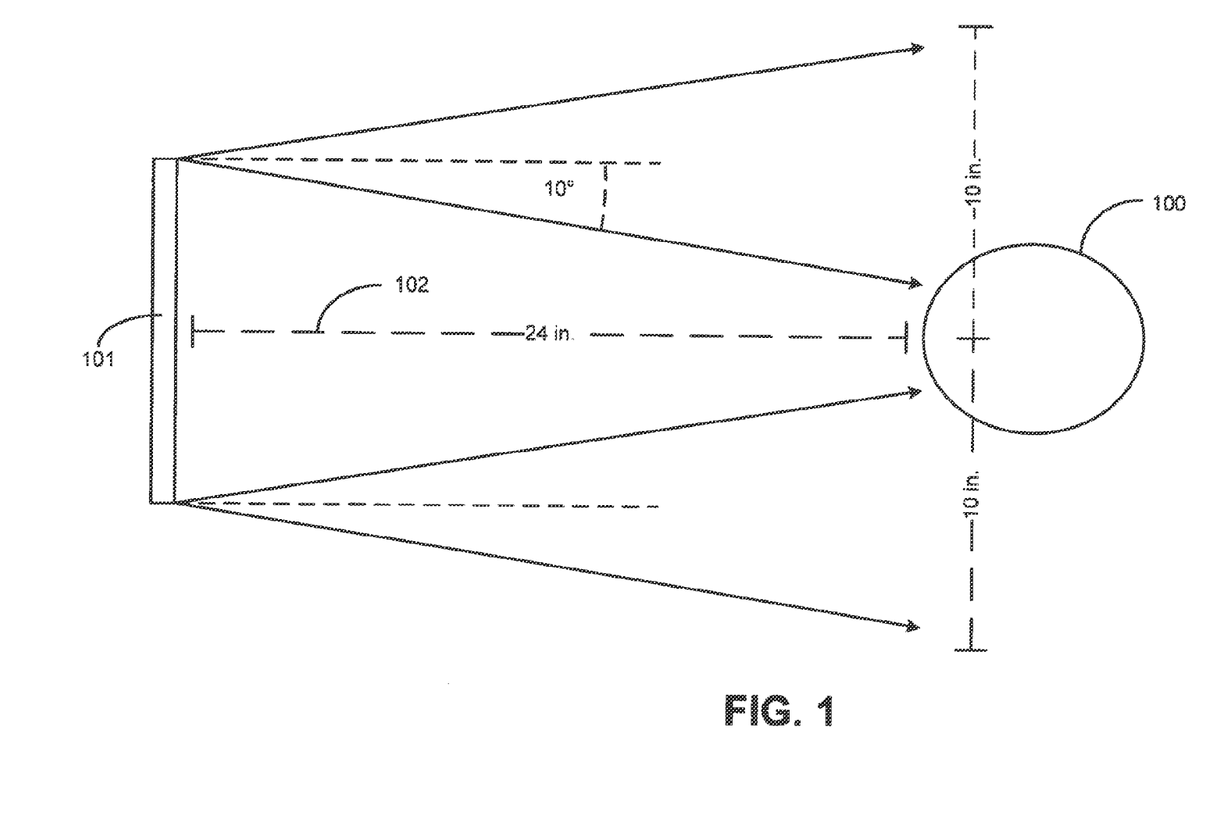
FIG. 1 illustrates a field of view for an image display device.

The field of view of a display device may be correlated to a half cone angle of a display element. For example, as shown in FIG. 1, when viewed by a user 100 at a distance of 24 inches, an 11-inch diagonal display 101 will require a half cone angle of approximately 10° so that a user 100 may view image elements near the edge of the display 101. Such a half cone angle will result in a limited amount of extraneous light being transmitted outside the field of view of a user where it may contact environmental surfaces resulting in reflections. Specifically, if a reflective surface (e.g. a cockpit canopy) is greater than approximately 10 inches from a centerline axis 102 of the display 101 at a distance of more than 24 inches from the display 101, any reflections will be transmitted behind the user 100.

Figure 2:
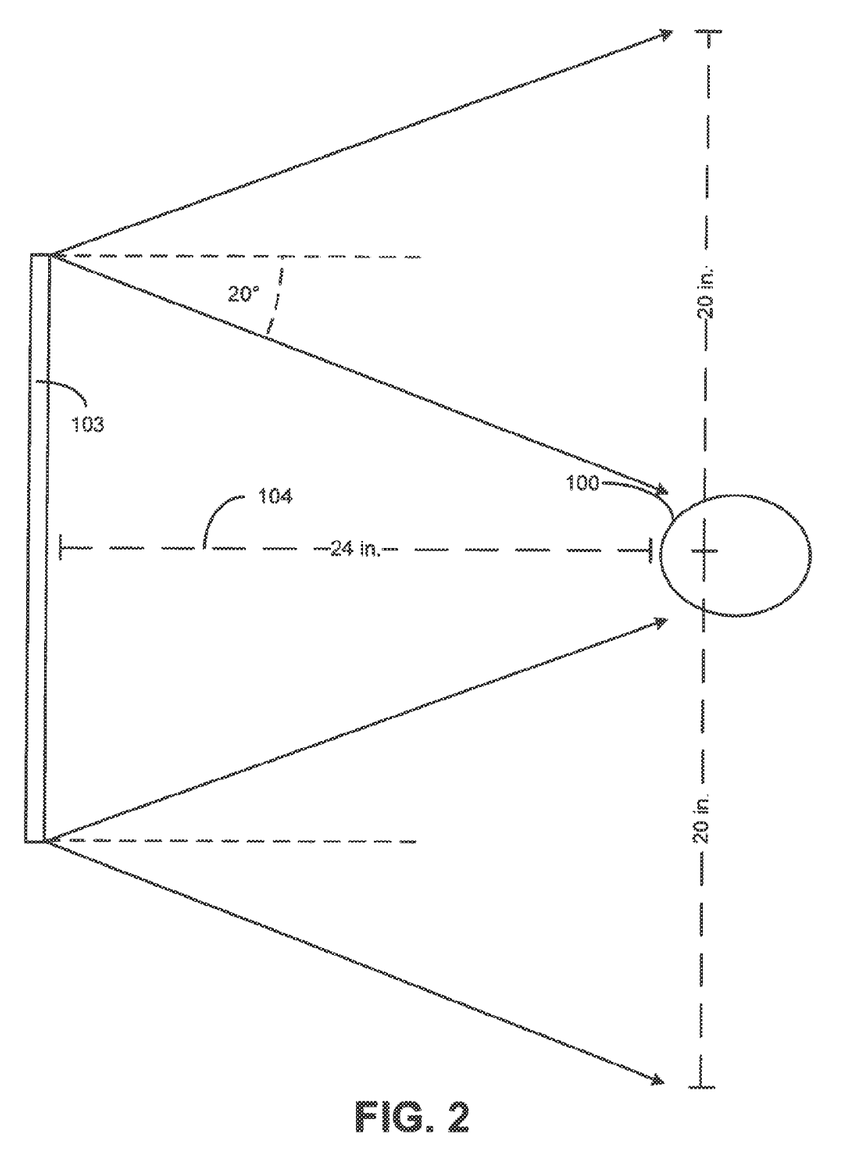
FIG. 2 illustrates a field of view for an image display device.
Figure 3:
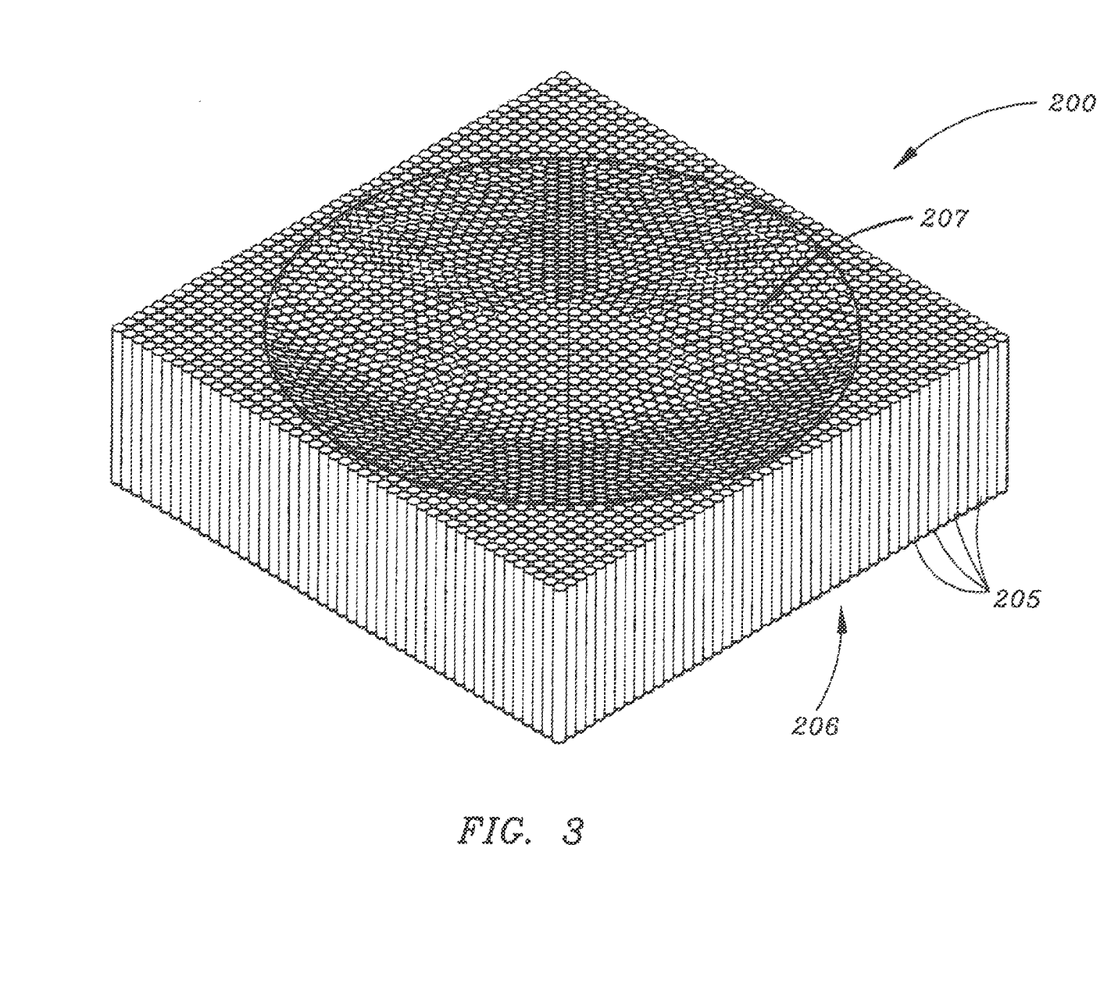
FIG. 3 illustrates a perspective view of a fiber optic plate.

However, as shown in FIG. 2, when viewed by a user 100 at a distance of 24 inches, a 22-inch diagonal display 103 will require a half cone angle of approximately 20° in order for the user 100 to view image elements near the edge of the display 103. Such a half cone angle will result in a greater amount of extraneous light being transmitted outside the field of view of a user where it may contact environmental surfaces resulting in reflections. Specifically, a reflective surface (e.g. a cockpit canopy) may need to be greater than approximately 20 inches from a centerline axis 104 of the display 103 to avoid reflections being transmitted to the user 100. Such distances may be impractical due to spatial constraints of the environment in which the display is to be employed (e.g. a cockpit canopy).

Referring to FIGS. 3-9, various representations of a fiber optic plate 200 is shown. The fiber optic plate 200 may serve to reduce the amount of extraneous light produced by an image display device transmitted outside the field of view of a user in order to minimize the potential for reflections from the surrounding environment.

Figure 4:
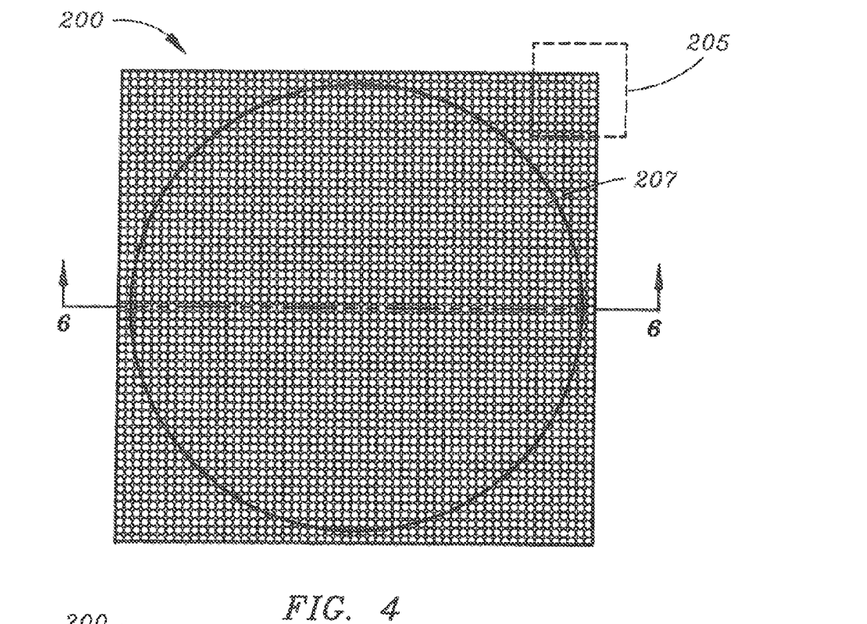
FIG. 4 illustrates a top view of a fiber optic plate.
Figure 5:
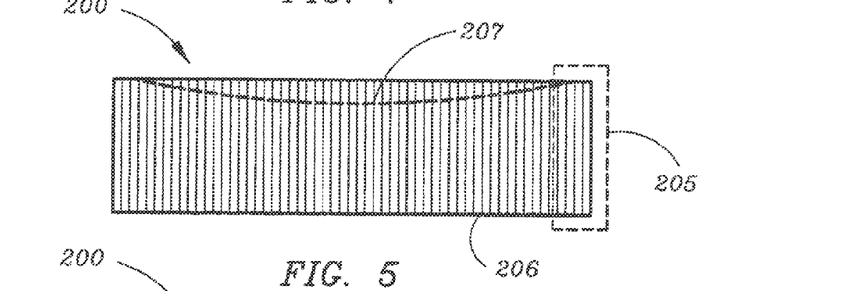
FIG. 5 illustrates a side view of a fiber optic plate.

Referring to FIGS. 4-5 the fiber optic plate 200 may be a directionalizing fiber optic plate 200 including a plurality of optical fibers 205. The optical fibers 205 may be constructed from silica, plastics, and the like. The optical fibers 205 may be aligned in a parallel manner so as to form an input surface 206 and an output surface 207. The optical fibers 205 may be configured such that the output surface 207 of the fiber optic plate 200 forms an at least partially concave shape. The perimeter of the shape of the concave portion of the output surface 207 may be circular (as in FIGS. 3-6) or square (as in FIGS. 7-9). However, it will be recognized that the perimeter of the shape of the concave portion of the output surface 207 may be sized so as to correspond to the shape of any image display device.

Figure 6:
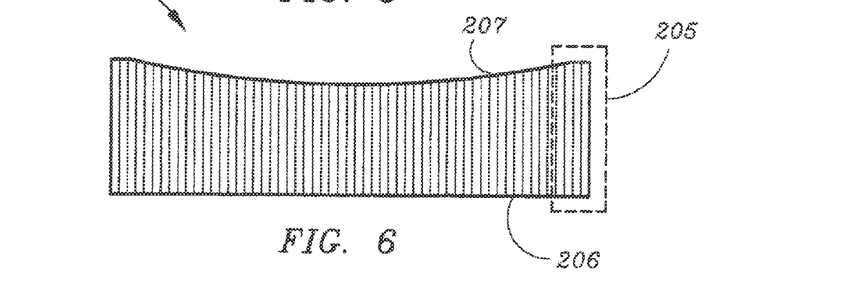
FIG. 6 illustrates a cross-sectional view of a fiber optic plate.
Figure 7:
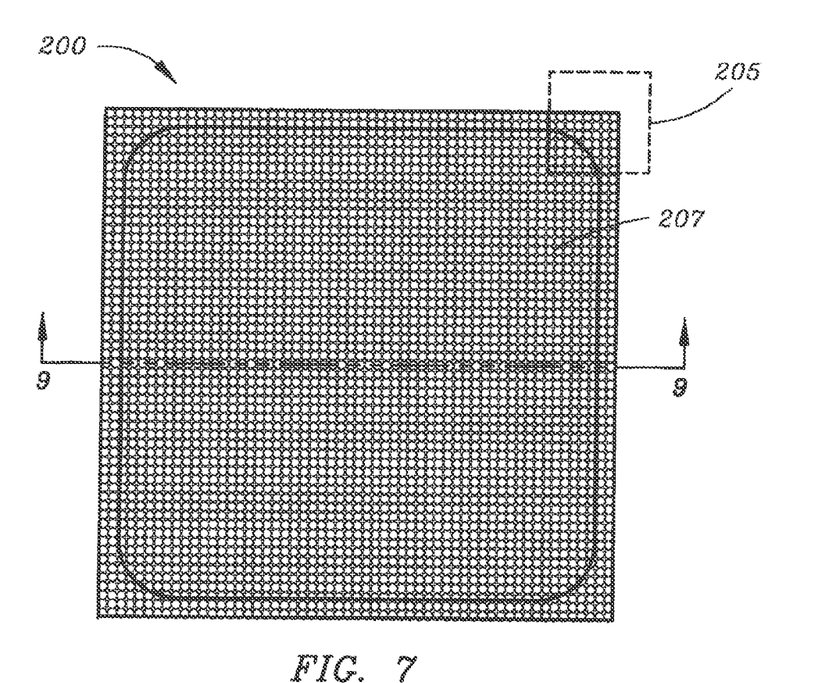
FIG. 7 illustrates a top view of a fiber optic plate.
Figure 8:
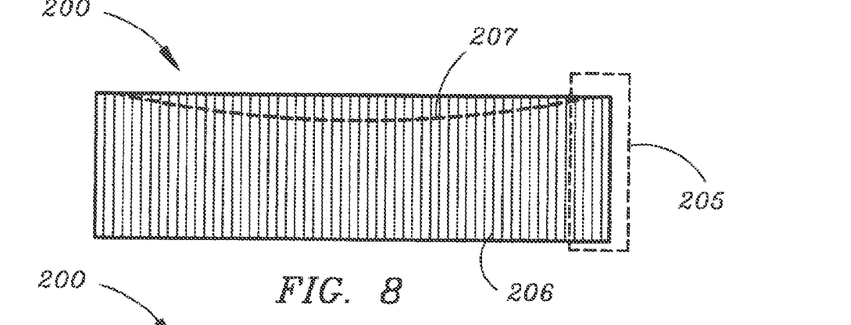
FIG. 8 illustrates a side view of a fiber optic plate.
Figure 9:
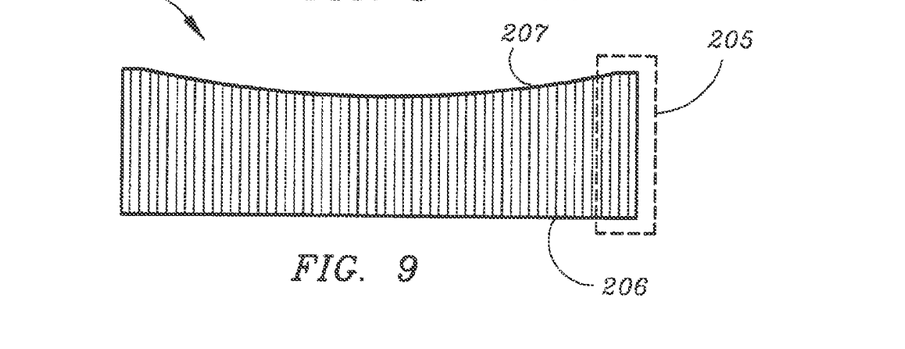
FIG. 9 illustrates a cross-sectional view of a fiber optic plate.
Figure 10:
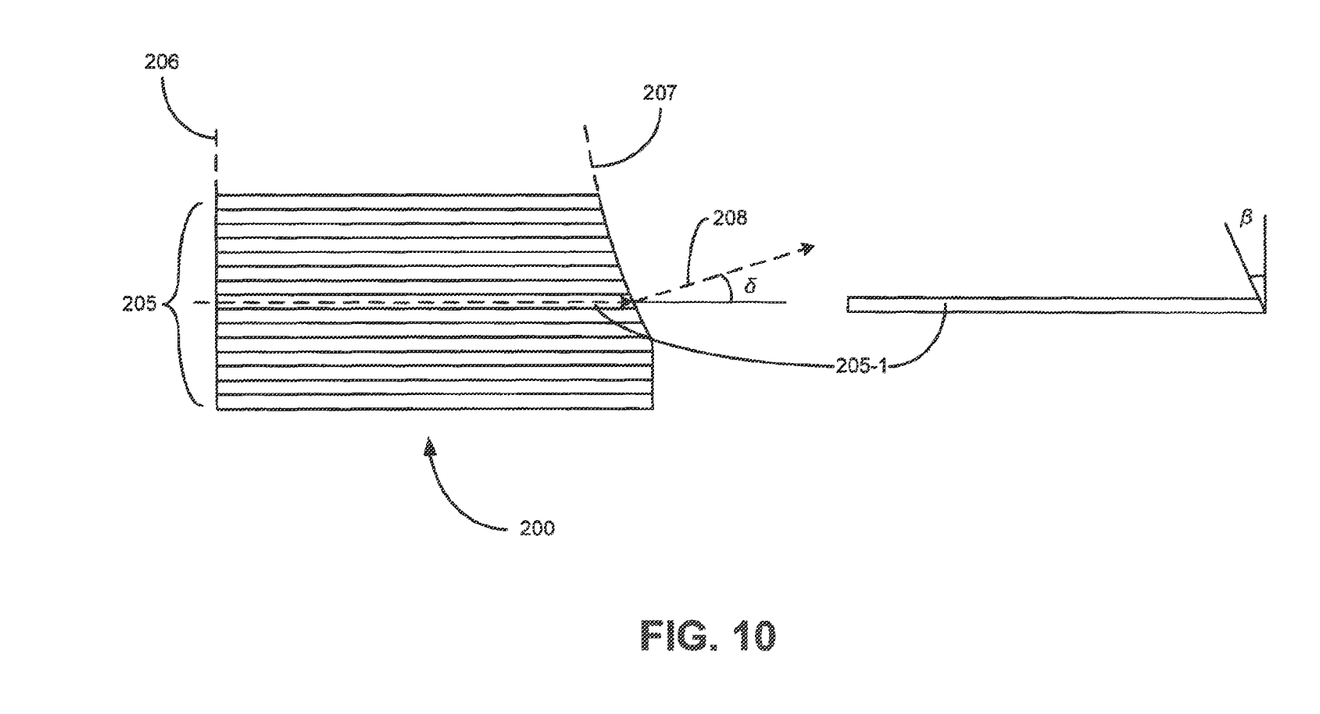
FIG. 10 the orientation of the optical axis of light emitted by a bias-cut optical fiber.

Referring to FIG. 10, the concave shape of the output surface 207 may be created by shaping the optical fibers 205 at a particular bias angle so as to bias the optical axis of the output light. As shown in FIG. 6, an optical fiber 205-1 cut at a bias angle ($\beta$) may result in an optical axis bias angle ($\delta$) for the output light. The relation between the bias angle (β) of optical fiber 205-1 and the optical axis bias angle (δ) is as follows:

$$\delta = \sin^{-1}\left(\frac{n_1 \beta \pi}{180 \cdot n_0}\right)$$ Equation (1)

where $n_1$ is the refractive index of the optical fiber 205-1 (typically ~1.52) and $n_0$ is the refractive index of air (typically ~1.0). For example, an optical fiber 205-1 cut at a bias angle (β) of 20° will have an optical axis bias angle (δ) of 32°. As such, the optical axes 208 light emitted by the optical fiber 205-1 will be directed inward towards a user and away from external reflective surfaces.

The bias angle shaping may be accomplished via various machining mechanisms include cutting, grinding, laser etching, and the like.

The particular curvature of the output surface 207 may be defined according to a particular application of an image display device 201. Specifically, the output surface 207 may be designed to minimize reflections resulting from portions of an aircraft canopy within a field of view of a user.

For example, in such avionics applications the image display device 201 may be a given distance from a pilot's head as defined by the seating configuration of the aircraft (e.g. 24 inches). The viewing angle from each portion of the image display device 201 to the pilot's head may be computed based various factors including the distance from the image display device 201 to the pilot's seat, the pilot's approximate height, and the like.

The bias angles of the optical fibers 205 forming the output surface 207 may be shaped to direct light from the various portions of the image display device 201 toward the pilot according to the computed viewing angles when the fiber optic plate 200 is disposed substantially adjacent (e.g. in front of or behind) the transmissive display panel 203.

Figure 11:
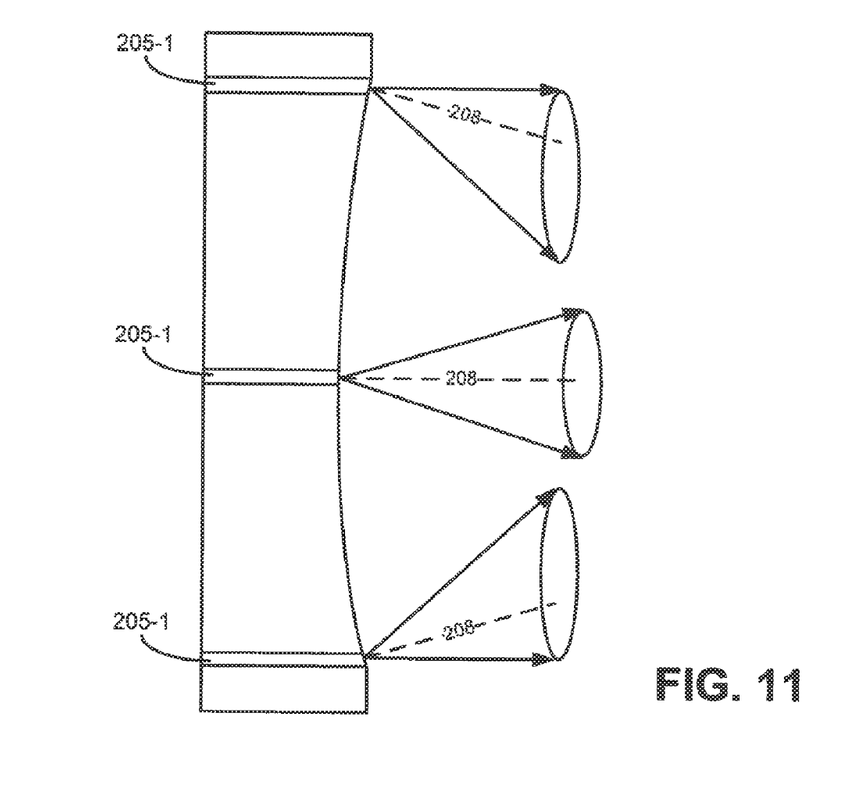
FIG. 11 the orientation of the optical axis and cone of light emitted by several bias-cut optical fibers.

Referring to FIG. 11, representative optical axes 208 of various portions of the output surface 207 are shown. The width of the cone of light produced an optical fiber 205-1 is a function if the numerical aperture of that optical fiber 205-1. It should be noted that the light emitted from the various optical fibers 205 becomes asymmetrical about their optical axes 208 when moving towards the perimeter of the output surface 207. Due to the asymmetrical nature of the light distribution, it is possible to design the fiber optic plate such that no light is transmitted outside the pilots head box and any extraneous light is eliminated from reaching the canopy further controlling canopy reflections.

As presented above, the concave shape of the output surface 207 may be employed to direct light output from an image display device 201 towards a viewer. However, it will be recognized that the angle of the bias cuts are greater towards the perimeter of the fiber optic plate 200 than in the middle of the fiber optic plate 200. As such, the portions of the middle of the fiber optic plate 200 may be substantially planar.

Figure 12:
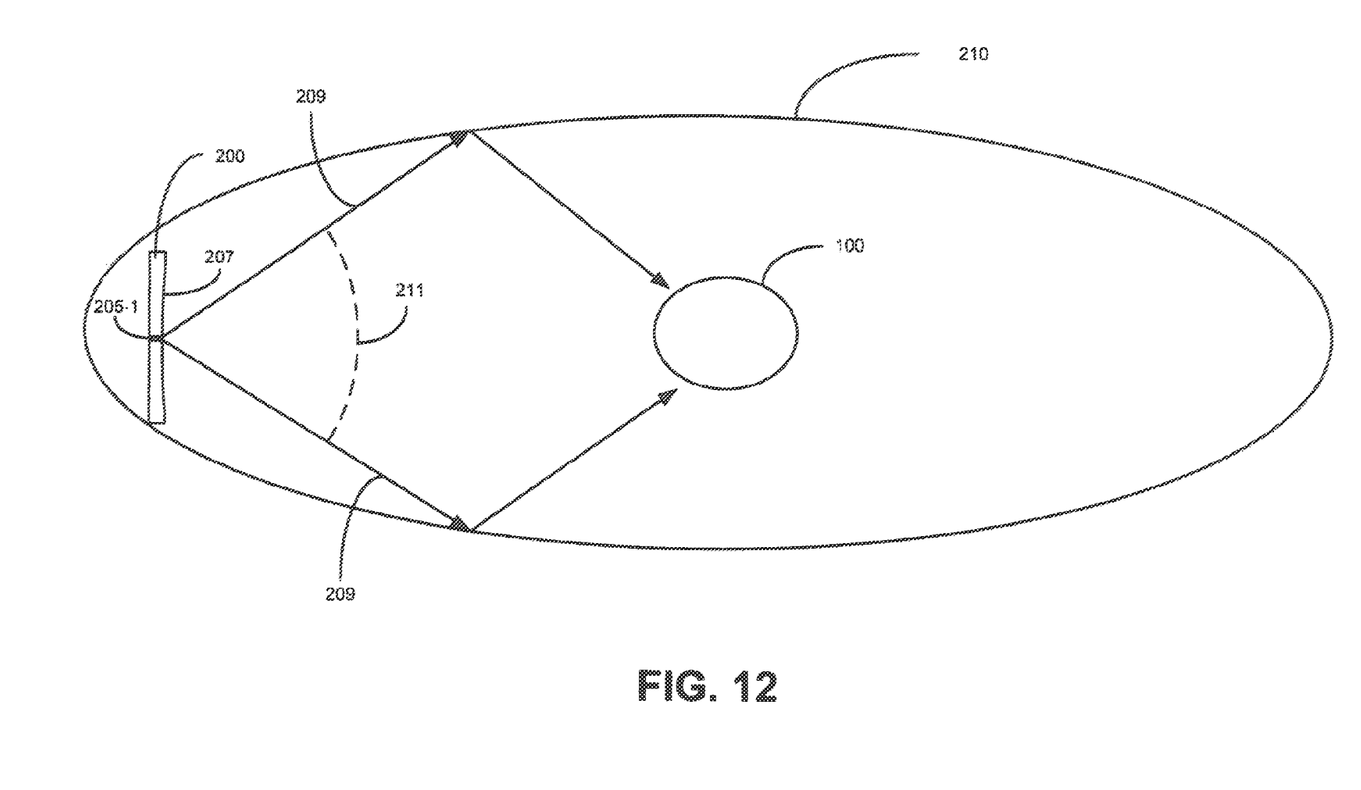
FIG. 12 an operational environment of a fiber optic plate.

Referring to FIG. 12, it may be the case that large optical fiber diameters (i.e. fibers with large numerical apertures) may result in extraneous light being transmitted outside a desired field of view when incorporated into the substantially planar portion of the output surface 207 of the fiber optic plate 200. For example, an optical fiber 205-1 having a large numerical aperture may have a resultant cone angle whereby light 209 projected against a reflective surface 210 (e.g. a cockpit canopy) having a given surface angle will be reflected into the field of view of a user 100 (e.g. a pilot).

In order to avoid such reflections due to the substantially planar portion of the fiber optic plate 200 the angle of the reflective surface 210, the line of sight vector of the user 100 associated with that reflective surface 210 and the relative positions of the image display device 201, the reflective surface 210 and the user 100 may be measured to determine a threshold angle 211 where light transmitted by the optical fiber 205-1 will be reflected into the field of view of the user 100.

Figure 13:
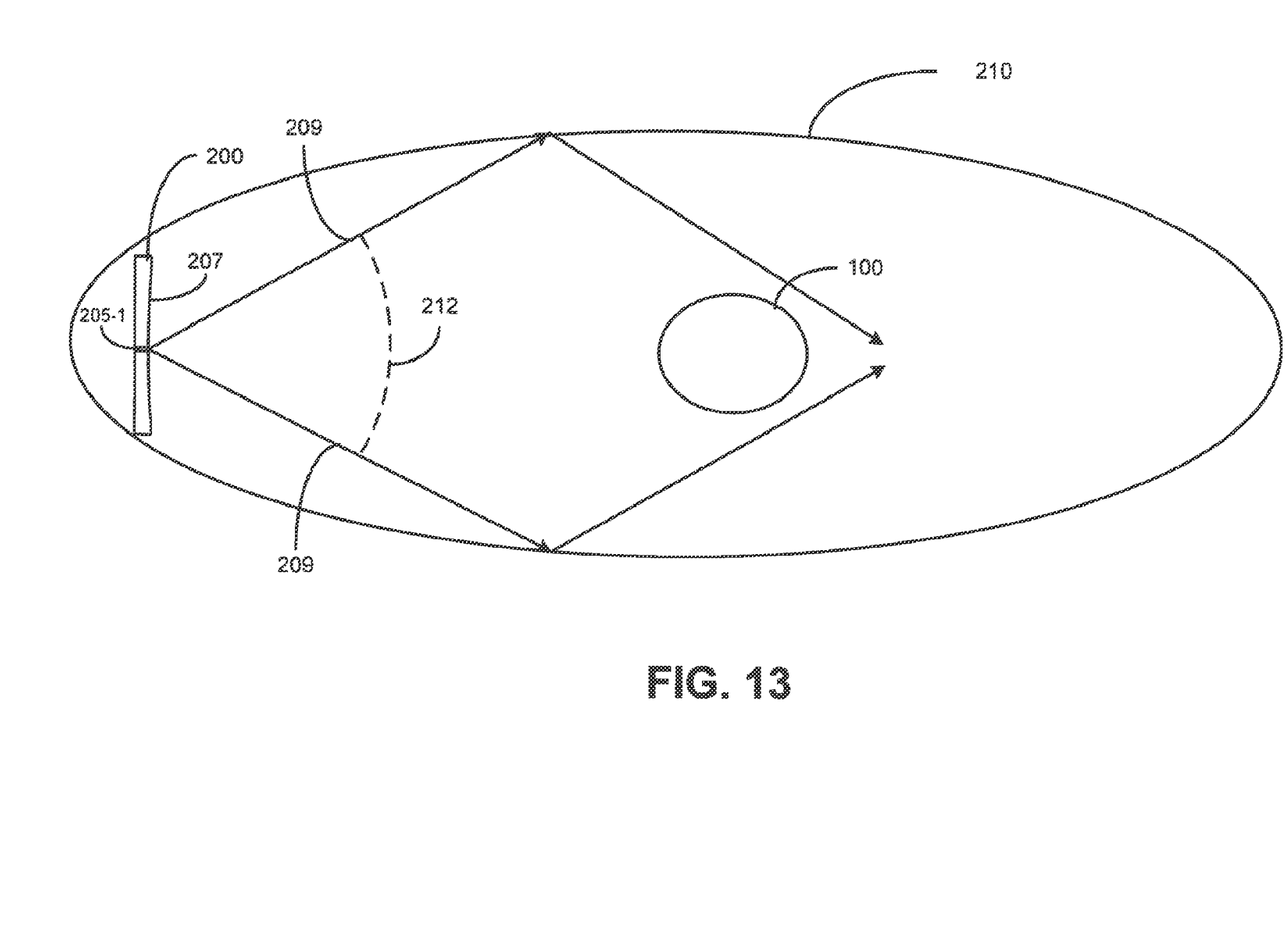
FIG. 13 an operational environment of a fiber optic plate.

Referring to FIG. 13, the dimensions of the optical fibers 205 within the substantially planar portion of the output surface 207 of the fiber optic plate 200 may be specified so that their emitted light is projected at an angle 212 less than the threshold angle 211.

While the specification of the dimensions of the optical fibers 205 described above is with respect to those optical fibers 205 located within the substantially planar portion of the output surface 207 of the fiber optic plate 200, similar methodologies may be employed with respect to the more arcuate portions of the output surface 207 of the fiber optic plate 200 to enable further customization of the fiber optic plate 200. For example, the optical fibers 205 located within the substantially planar portion of the output surface 207 may have a first numerical aperture value while the optical fibers 205 forming the more arcuate portions of the output surface 207 of the fiber optic plate 200 may have a second numerical aperture value.

Figure 14A:
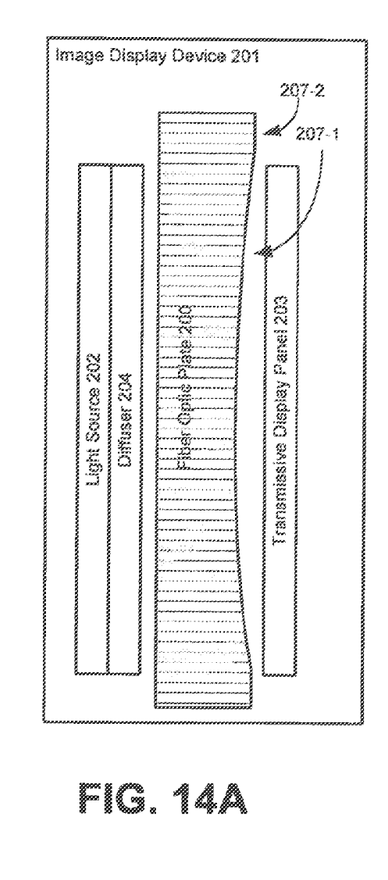
FIG. 14A illustrates an image display device.

Referring to FIG. 14A, the fiber optic plate 200 may be incorporated within an image display device 201 between the light source 202 and the transmissive display panel 203. In addition to the fiber optic plate 200, the image display device 201 may include a light source 202, a transmissive display panel 203, and a diffuser 204. The light source 202 may include a light-emitting diode (LED), organic LED, cold cathode fluorescent lamp (CCFL), and the like. The transmissive display panel 203 may include a transmissive electro-optical device such as a liquid crystal display, an electrophoretic display, a suspended particle display, electrochromic display, and the like. The light source 202 may emit light which may be directed through the transmissive display panel 203 towards a given focal point (e.g. a pilot) by the fiber optic plate 200.

Figure 14B:
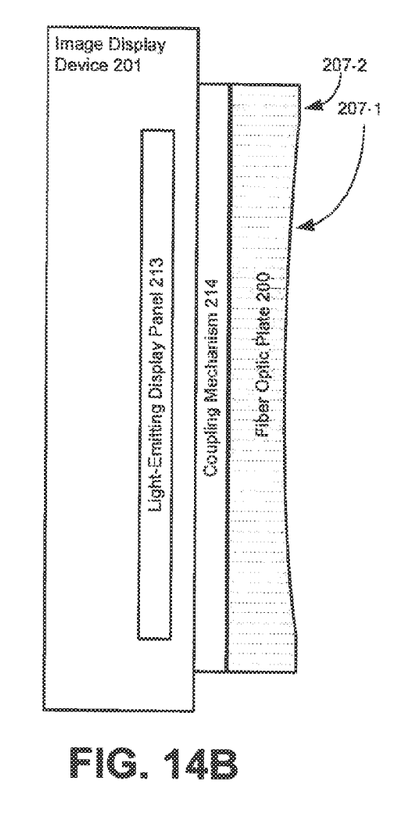
FIG. 14B illustrates an image display device.

Referring to FIG. 14B, the fiber optic plate 200 may be affixed to the front surface of an image display device 201 by a temporary or permanent coupling mechanism 214. For example, the coupling mechanism 214 may include a pressure sensitive adhesive layer 214 disposed between the fiber optic plate 200 and a front surface of the image display device 201. Alternately, the coupling mechanism 214 may include clips, bolts and the like (not shown) which may engage cooperating structures (e.g. clip tabs, threaded apertures and the like) on the fiber optic plate 200 and/or the image display device 201 so as to affix the fiber optic plate 200 to the image display device 201. Such a configuration may allow for aftermarket application of the fiber optic plate 200 to existing transmissive display devices or the use of the fiber optic plate 200 with a light-emitting display panel 213 (e.g. a plasma display, an LED display, an OLED, a CRT display and the like). The light-emitting display panel 213 may emit light which may be directed through the fiber optic plate 200 towards a given focal point (e.g. a pilot).

Further, as shown in FIGS. 14A and 14B, the fiber optic plate 200 may be sized such that the arcuate portion 207-1 of its output surface 207 aligns with the perimeter of the light source 202 or the light-emitting display panel 213 while the substantially planar portions of the periphery of its output surface 207-2 are outside the perimeter of the light source 202 or the light-emitting display panel 213. Such a configuration may limit the transmission of light by the optical fibers 205 composing any substantially planar portions of the periphery of the output surface 207 from transmitting the in order to avoid the transmission of light outside the field of view defined only by the arcuate portion 207-1.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An image display device comprising:
    a light source; and
    a fiber optic plate, the fiber optic plate comprising a plurality of parallel optical fibers, the terminal ends of the optical fibers combining to define a light input surface and an at least partially concave light output surface.

2. The image display device of claim 1, wherein the concave light output surface is configured to direct light received at the light input surface substantially toward at least one focal point.

3. The image display device of claim 1, further comprising:
    a transmissive image display panel.

4. The image display device of claim 1, wherein the light source comprises:
    a light-emitting image display panel.

5. The image display device of claim 1, wherein the fiber optic plate comprises:
    at least one optical fiber having a first numerical aperture and at least one optical fiber having at least a second numerical aperture.

6. An apparatus comprising;
    a fiber optic plate, the fiber optic plate comprising a plurality of parallel optical fibers, the terminal ends of the optical fibers combining to define a light input surface and an at least partially concave light output surface; and
    a mechanism for affixing the fiber optic plate to a display device.

7. The apparatus of claim 6, wherein the concave light output surface is configured to direct light received at the light input surface substantially toward at least one focal point.

8. The apparatus of claim 6, wherein the fiber optic plate comprises:
    at least one optical fiber having a first numerical aperture and at least one optical fiber having at least a second numerical aperture.

9. A method comprising:
    computing one or more viewing angles between one or more elements of an image display and a focal point; and
    shaping a fiber optic plate output surface according to the one or more viewing angles.

10. The method of claim 9, wherein the computing one or more viewing angles between one or more elements of an image display and a focal point further comprises:
    computing a cone angle associated with one or more optical fibers having one or more numerical apertures; and
    determining the presence one or more reflective surfaces which result in a reflection viewable at the focal point within the cone angle associated with one or more optical fibers.

11. The method of claim 10, wherein the shaping a fiber optic plate output surface according to the one or more viewing angles comprises:
    shaping a fiber optic plate output surface according to the one or more viewing angles such that the one or more reflective surfaces are outside the cone angle associated with one or more modified optical fibers.

12. The method of claim 9, wherein the shaping a fiber optic plate output surface according to the one or more viewing angles further comprises:
    making a one or more bias angle cuts to one or more optical fibers of a fiber optic plate according to the one or more viewing angles.

13. The method of claim 9, further comprising:
    disposing the fiber optic plate in a position substantially adjacent to the image display.

14. The method of claim 9, wherein the making a one or more bias angle cuts to one or more optical fibers of a fiber optic plate according to the one or more viewing angles further comprises:
    making a one or more bias angle cuts to one or more optical fibers of a fiber optic plate such that light transmitted from the one or more optical fibers is directed substantially towards the focal point.

15. The method of claim 9, wherein the bias angle cuts of the one or more optical fibers combine to form a concave surface of the fiber optic plate.

* * * * *